United States Patent Office 3,546,197
Patented Dec. 8, 1970

3,546,197
LIGNIN SULPHONATE DISPERSING AGENTS AND METHODS OF MAKING THE SAME
Julius Benko, Sillery, Quebec, Quebec, Canada, assignor by mesne assignments, to Dryden Chemicals Limited, Oakville, Ontario, Canada, a Canadian company
No Drawing. Continuation-in-part of application Ser. No. 582,229, Sept. 27, 1966. This application Jan. 23, 1969, Ser. No. 793,607
Int. Cl. C07g *1/00;* C09b *67/00*
U.S. Cl. 260—124                                14 Claims

ABSTRACT OF THE DISCLOSURE

This invention relates to the production of ammonium and alkali metal lignosulphonate dispersing agents from spent sulphite liquor solids by a combination of a heat treatment step carried out at a temperature from about 130° C. to 175° C. and a fractionation step.

---

This application is a continuation-in-part of Ser. No. 582,229, filed Sept. 27, 1966 now abandoned.

This invention relates to lignin dispersing agents and to methods of making the same. More particularly, the invention relates to lignin dispersing agents selected from the group consisting of ammonium and alkali metal lignosulphonates suitable for, but not limited to, use in preparing aqueous dispersion of dyes.

Lignin sulphonates are known to be effective dye dispersing agents. In U.S. Pat. No. 1,837,772 (issued Dec. 22, 1931, A. J. Hailwood et al.) there is disclosed a method for improving the dyestuff dispersant characteristics of spent sulphite liquor materials by oxidizing such materials with nitric acid. In U.S. Pat. No. 2,491,832 (issued Dec. 20, 1949, J. R. Salvesen et al.) there is described a sulphuric acid precipitation method of fractionating strong caustic heat treated spent sulphite liquor for obtaining a dyestuff dispersant of markedly superior quality. K. F. Keirstead et al. in U.S. Pat. No. 3,094,515 (issued June 18, 1963) disclosed a new caustic heat treatment for spent sulphite liquor, but they relied on the sulphuric acid precipitation procedure for the fractionation process. More recently, L. A. Blaisdell in U.S. Pat. No. 3,156,520 (issued Nov. 10, 1964) has described a lignosulphonate dispersant which consists of the low molecular weight fraction lignosulphonates and the sugar acids of spent sulphite liquor.

It is an object of this invention to provide a process for preparing lignin dispersing agents superior to those known in the art as well as to the products produced by this process.

Contrary to the teachings of the prior art, it has now been determined from tests carried out on disperse dyes that superior dyestuff dispersants can be obtained from the high molecular weight lignosulphonate-containing fraction of spent sulphite liquor solids, following a heat treatment and appropriate method of fractionation thereof. Such high molecular weight lignosulphonate-containing fractions of heat treated spent sulphite liquor solids of the present invention are characterized by having an increased number of acid groups on their lignosulphonate macromolecules and by their ensuing improvement in dispersing ability which is superior to that of similar high molecular weight lignosulphonate-containing fractions without such additional acid groups, to that of low molecular weight lignosulphonate-containing fractions, and to that of the unfractionated heat treated spent sulphite liquor solids.

While the lignin dispersing agents most commonly used in industry as dye dispersants are sodium lignosulphonates, the use of ammonium, lithium or potassium lignosulphonate dispersants provides particular advantages with regard to their solubilities and other inherent properties which will be apparent to those skilled in the art and it has been found that the complete or partial replacement of sodium by ammonium, lithium or potassium in these lignosulphonates does not adversely affect the performance of the dispersants.

According to the present invention, a sodium base spent sulphite liquor is employed as the lignosulphonate-containing starting material in the process for preparing the alkali metal lignosulphonate dispersants, while for economic reasons an ammonium base spent sulphite liquor is used as the starting material in the production of the ammonium lignosulphonate dispersant. The sodium base spent sulphite liquor may be that produced by a sodium base pulping process or it may be one obtained by replacing another pulping base, such as calcium, magnesium and ammonium, with sodium following any of the methods known to those familiar with the art.

In accordance with the invention, there are two-important operational steps involved in the preparation of the improved dispersant from the spent sulphite liquor starting material and these steps may be carried out in either order, namely, heat treatment of the spent sulphite liquor and then fractionation to obtain the high molecular weight lignosulphonate-containing fraction or fractionation of the spent sulphite liquor to obtain the high molecular weight lignosulphonate-containing fraction which is then subjected to a heat treatment. Practical applications and convenience are the deciding factors in determining which step is carried out first. The sequence in which the steps are carried out does not alter the quality of the resulting product. However, proceeding with the fractionation step first and performing the heat treatment on the fractionated material has several advantages:

(1) Only the desired high molecular weight lignosulphonate-containing fraction is subjected to the heat treatment, reducing processing costs and increasing the capacity of the reactor;

(2) The life of the resins and membrane used in certain fractionation procedures is usually longer at near neutral pH values than in the strongly basic solutions which usually are obtained from the heat treatment step; and (3) There is less objectionable insoluble material in the original spent sulphite liquor than in the heat treated spent sulphite liquor to interfere in the fractionation step.

The heat treatment involves heating the spent sulphite liquor, which usually has a solids concentration of about 40%, at temperature from about 130° C. to about 175° C., preferably from about 155° C. to 175° C., for a period of from about 45 minutes to about 4 hours, usually in the presence of more than 2% and less than 20%, preferably between 10% and 15%, by weight of the alkali metal or ammonium hydroxide. Longer reaction times will be required when the caustic concentrations and/or the reaction temperatures are in the lower ranges. The purpose of the heat treatment is to increase the number of functional acid groups on the macromolecule.

The fractionation step consists in the separation of a fraction containing not more than about 70%, preferably about 60%, of the spent sulphite liquor solids having the high molecular weight lignosulphonates included therein. Less than 60% of the spent sulphite liquor solids can be separated out in a usable fraction without affecting the quality of the product, but for economic reasons the percentage cut should be as high as possible. The method of fractionation used is characterized by the fact that it does not involve a chemical change in the reaction mixture in contrast to the known sulphuric acid precipitation procedure and may be described on a suitcal rather than a chemical method. Fractionation methods of this nature include diffusional separation on a suitable resin column, dialysis, reverse osmosis and solvent extraction techniques and the like.

The manner of fractionation is extremely important since it is essential that all available acid groups, many of them produced during the heat treatment if this step has preceded the fractionation step, remain on the lignosulphonate macromolecules. The sulphuric acid precipitation procedure of the prior art is disadvantageous because it causes a marked loss of acid groups (disulphonation) from the lignosulphonate macromolecule.

As a specific embodiment of this invention it has been determined that continuous blowing with an oxidizing gas, such as air, during the heat treatment step is an additional, effective aid in producing the superior dispersing agent of the present invention. The gas is passed through the reaction mixture at a pressure sufficient to work against the steam pressure in the reactor, about 100 p.s.i. The amount of gas passed through the mixture does not appear to be critical and a rate of 0.3 to 0.5 cu. ft. per minute per gallon has been found adequate.

When preparing lithium or potassium lignosulphonate dispersants it is advisable, for economic reasons, to fractionate the sodium base spent sulphite liquor to obtain the high molecular weight fraction before carrying out the cation exchange procedure according to methods known in the art for replacing the sodium by lithium or potassium. The lithium or potassium lignosulphonate material thus obtained is then made strongly alkaline by the addition of from about 5% to 15% by weight, calculated on the spent sulphite liquor solids, of lithium or potassium hydroxide and subjected to the heat treatment in the manner described above.

Mixed sodium-potassium or sodium-lithium lignosulphonate dispersants are prepared from the fractionated sodium lignosulphonate material, without replacing its sodium content, simply by admixing therewith about 5% to 15%, based on the weight of solids, of the potassium or lithium hydroxide as desired, and then carrying out the heat treatment in the manner described above.

If diffusional separation is used in the fractionation step in preparing ammonium lignosulphonate dispersants, it is performed while using the appropriate resin bed in the ammonium salt form. Due to the volatile nature of ammonia, air-blowing in the presence of free ammonia during the heat treatment step is self-defeating; however, the air-blowing heat treatment of ammonia base liquor without the addition of free ammonia in combination with the fractionation step also results in the improved dye dispersant of the present invention.

As a further embodiment of the present invention it has been found expedient to incorporae complex iron and chromium ions in the lignosulphonate molecules in those dispersants intended for use with iron- or chromium-containing pigments. The presence of the complex iron or chromium in the dispersing agent in an amount up to 10% by weight protects the iron or chromium of the pigment from being removed and complexed by the lignosulphonate dispersing agent, thus the important properties of the dye are left intact. The addition of iron is accomplished by adding a ferric salt such as a chloride, sulfate or acetate to the fractionated sodium lignosulphonate material before the caustic heat treatment is carried out. In the same way, the addition of chromium can be accomplished by adding sodium dichromate to the fractionated sodium lignosulphonate material; trivalent chromium salts can also be used but without the additional oxidation benefit provided by the dichromate.

A specific application of the process of this invention is exemplified in Examples XXXIII and XXXIV for the preparation of good vat dye and carbon black dispersants, which involves subjecting a sodium base or ammonium base spent sulphite liquor to a heat treatment, using from about 3% to about 5% by weight on a solids basis of sodium or ammonium hydroxide, at a temperature from about 130° C. to 175° C., preferably about 155° C., for from about 45 minutes to 2 hours. Air-blowing during this treatment appears to give no added improvement. In the fractionation step following the heat treatment, a fraction containing less than 50%, preferably about 40%, of the total solids provides the high molecular weight lignosulphonate dispersant of this embodiment.

Specific embodiments of the invention and comparisons with prior art processes and products will now be described by reference to examples and tables. The manner of preparing the dispersing agents referred to in the tables is given in Examples I to XX. Examples XXI to XXIV describe preparations of lithium and potassium lignosulphonate dispersants. Examples XXV to XXX illustrate the preparation of ammonium lignosulphonate dispersants. Examples XXXI and XXXII describe the preparation of sodium lignosulphonate dispersing agents containing complex iron or chromium.

EXAMPLE I

Unfractionated sodium base spent sulphite liquor having a solids concentration of about 40% was heated with the addition of about 15% by weight (calculated on the weight of said solids) sodium hydroxide for about two hours at about 155° C. under continuous air-blowing Thereafter, fractionation to obtain the high molecular weight lignosulphonates was carried out utilizing the diffusional separation technique.

EXAMPLE II

Spent sulphite liquor having a solids concentration of about 45% was heated with the addition of about 5% by weight sodium hydroxide (calculated on the weight of said solids) for about forty-five minutes to about 170° C. Thereafter, fractionation to obtain the high molecular weight lignosulphonate fraction was carried out utilizing the diffusional separation technique.

EXAMPLE III

Spent sulphite liquor solids were treated within the scope of the teachings of U.S. Pat. No. 3,094,515.

EXAMPLE IV

Spent sulphite liquor solids were treated within the scope of the teachings of U.S. Pat. No. 2,491,832.

EXAMPLE V

Spent sulphite liquor solids were first fractionated by means of the Howard lime precipitation process (U.S. Pat. Re. No. 18,268 to G. C. Howard) and the high molecular weight lignosulphonates thus obtained were converted to the sodium salts and then subjected to the caustic heat treatment described in Example I.

EXAMPLE VI

Spent sulphite liquor was first fractionated by means of diffusional separation and the high and medium molecular weight lignosulphonate-containing fraction thus obtained and containing up to 70% of the total solids was then subjected to the caustic heat treatment described in Example I.

EXAMPLE VII

Spent sulphite liquor was first fractionated by means of conventional dialysis to yield 40 percent of the total solids in the high molecular weight lignosulphonate-containing fraction, which was then subjected to the caustic heat treatment described in Example I.

EXAMPLE VIII

Spent sulphite liquor was first fractionated by conventional dialysis to yield about 72 percent of the total solids in the medium and high molecular weight lignosulphonate-containing fraction which was then subjected to the caustic heat treatment described in Example I.

EXAMPLE IX

Example I was repeated except that conventional dialysis was used in place of diffusional separation as the method of fractionation.

EXAMPLE X

Spent sulphite liquor was first fractionated by means of ultrafiltration (reverse osmosis) and the high molecular weight lignosulphonate-containing fraction was then subjected to the caustic heat treatment described in Example I.

EXAMPLE XI

Spent sulphite liquor was first fractionated by means of electrodialysis and the high molecular weight lignosulphonate-containing fraction was then subjected to the caustic heat treatment described in Example I.

EXAMPLE XII

Spent sulphite liquor was first fractionated by means of isopropanol extraction and the high molecular weight lignosulphonate-containing fraction was then subjected to the caustic heat treatment described in Example I.

EXAMPLE XIII

Example I was repeated except that isopropanol extraction was used as the method of fractionation.

EXAMPLE XIV

Spent sulphite liquor was first fractionated by means of acetone extraction and the high molecular weight lignosulphonate-containing fraction was then subjected to the caustic heat treatment described in Example I.

EXAMPLE XV

Example I was repeated except that acetone extraction was used as the method of fractionation.

EXAMPLE XVI

Spent sulphite liquor was first fractionated by means of diffusional separation and the high molecular weight lignosulphonate-containing fraction was subjected to the caustic heat treatment described in Example I but without the continuous air-blowing.

EXAMPLE XVII

Spent sulphite liquor was first fractionated by means of diffusional separation and the high molecular weight lignosulphonate-containing fraction was then subjected to the caustic heat treatment described in Example I except under carbon dioxide-blowing rather than air-blowing.

EXAMPLE XVIII

Spent sulphite liquor was first fractionated by means of diffusional separation and the high molecular weight lignosulphonate-containing fraction was then subjected to the caustic heat treatment decribed in Example I except under nitrogen-blowing rather than air-blowing.

EXAMPLE XIX

Spent sulphite liquor was treated as in Example III and then fractionated by means of diffusional separation.

EXAMPLE XX

Air-blown caustic heat treatment experiments were carried out on a spent sulphite liquor having a 40 percent solids concentration to determine the optimum conditions with regard to the duration of the reaction and to the amount of caustic to be used. In each of the experiments, the spent sulphite liquor material was heat treated at 155° C. with different percentages of sodium hydroxide for different lengths of time; then 65 percent of the total solids was separated by fractionation using the diffusional separation technique and used for dye dispersion tests.

EXAMPLE XXI

Sodium base spent sulphite liquor was first fractionated by means of diffusional separation and the high and medium molecular weight fractions thus obtained and containing up to 70 percent of the total solids were converted to the free acid form by means of cation exchange. The lignosulphonic acid solution was neutralized with potassium hydroxide, and an additional 15 percent by weight of potassium hydroxide was added. Heat treatment under continuous air-blowing was then carried out at about 155° C. for about 2 hours.

EXAMPLE XXII

Sodium base spent sulphite liquor was first fractionated by means of diffusional separation and to the high and medium molecular weight fractions thus obtained 15 percent by weight of potassium hydroxide was added. Heat treatment under continuous air-blowing was then carried out at about 155° C. for about 2 hours.

EXAMPLE XXIII

Sodium base spent sulphite liquor was first fractionated by means of diffusional separation and the high and medium molecular weight fractions thus obtained and containing up to about 70 percent of the total solids were converted to the free acid form by means of cation exchange. The lignosulphonic acid solution was neutralized with lithium hydroxide and an additional 12 percent by weight of lithium hydroxide was added. Heat treatment under continuous air-blowing was then carried out at about 155° C. for about 2 hours.

EXAMPLE XXIV

Sodium base spent sulphite liquor was first fractionated by means of diffusional separation and to the high and medium molecular weight fractions thus obtained 12 percent by weight of lithium hydroxide was added. Heat treatment under continuous air-blowing was then carried out at about 155° C. for about 2 hours.

EXAMPLE XXV

Ammonium base spent sulphite liquor was first fractionated by means of diffusional separation and the high and medium molecular weight fractions thus obtained were concentrated to between about 27 and 50 percent solids content. To the concentrated ammonium lignosulphonate solution 10 percent by weight of ammonium hydroxide was added and the reaction mixture was subjected to heat treatment at about 155° C. for about 2 hours.

EXAMPLE XXVI

Ammonuium base spent sulphite liquor was first fractionated by means of diffusional separation and the high and medium molecular weight fractions thus obtained were concentrated and subjected to air-blowing heat treatment at about 155° C. for about 2 hours.

EXAMPLE XXVII

Ammonium base spent sulphite liquor was first fractionated by means of diffusional separation and the high and medium molecular weight fractions thus obtained and containing up to about 70 percent of the total solids were concentrated and subjected to a heat treatment at about 155° C. for about 2 hours, without air-blowing and without chemical addition.

EXAMPLE XXVIII

To a concentrated ammonium base spent sulphite liquor 10 percent by weight of ammonium hydroxide was added. The reaction mixture was subjected to heat treatment at about 155° C. for about 2 hours and thereafter to fractionation by means of diffusional separation.

EXAMPLE XXIX

Concentrated ammonium base spent sulphite liquor was subjected to air-blowing heat treatment at about 155° C.

for about 2 hours and thereafter to fractionation by means of diffusional separation.

EXAMPLE XXX

Concentrated ammonium base spent sulphite liquor was subjected to heat treatment at between 150 and 170° C. for about 1–3 hours and was fractionated thereafter in such a way as to obtain up to about 70 percent of the total solids in the preferred high molecular weight fraction.

EXAMPLE XXXI

Sodium base spent sulphite liquor was first fractionated by means of diffusional separation. To the high and medium molecular weight fractions thus obtained and containing up to about 70 percent of the total solids aqueous sodium bichromate was admixed in an amount between 1 and 5 percent chromium content on solids basis. Thereafter about 10 percent of sodium hydroxide on solids basis was added and the reaction mixture was subjected to an air-blowing heat treatment at about 155° C. for about 2 hours.

EXAMPLE XXXII

Sodium base spent sulphite liquor was first fractionated by means of diffusional separation. To the high and medium molecular weight fractions thus obtained and containing up to about 70 percent of the total solids a concentrated solution of ferric chloride was admixed in an amount corresponding to an iron addition of between 3 and 10 percent. Thereafter about 15–20 percent of sodium hydroxide on solids basis was added and the reaction mixture was subjected to an air-blowing heat treatment at about 155° C. for about 2 hours.

EXAMPLE XXXIII

Sodium base spent sulphite liquor was subjected, following the addition of 3–5 percent of sodium hydroxide on solids basis, to a heat treatment at about 155° C. for about 2 hours. Thereafter fractionation was performed by means of diffusional separation in such a way as to obtain about 40 percent of the total solids in the preferred high molecular weight fraction.

EXAMPLE XXXIV

Ammonium base spent sulphite liquor was subjected, following the addition of 3–5 percent of ammonium hydroxide on solids basis, to a heat treatment at about 155° C. for about 1–2 hours. Thereafter, fractionation was performed by means of diffusional separation in such a way as to obtain about 40 percent of the total solids in the preferred high molecular weight fraction.

TABLE I

| Dispersant | Method of preparation | Percent S | Equivalent weight | Molecular weight |
|---|---|---|---|---|
| 1 | U.S. Pat. 2,491,832 | 1.70 | 348 | 13,800 |
| 2 | do | 3.37 | 329 | 15,400 |
| 3 | do | 1.50 | 328 | 9,600 |
| 4 | U.S. Pat. 3,094,515 | 1.83 | 547 | 34,600 |
| Average of 1 to 4 | | 2.10 | 388 | 18,350 |
| 5 | Present invention | 4.96 | 278 | 4,400 |
| 6 | do | 5.53 | 264 | 9,300 |
| 7 | do | 5.58 | 256 | 7,900 |
| 8 | do | 6.07 | 245 | 8,100 |
| 9 | do | 4.50 | 261 | 4,900 |
| 10 | do | 4.20 | 267 | 16,800 |
| Average of 5 to 10 | | 5.14 | 262 | 8,570 |

Table I gives a comparison of the analytical data of air-blown caustic heat treated spent sulphite liquor derived high molecular weight dye dispersants prepared by the process of the present invention and of dye dispersants prepared by the processes described in U.S. Pat. Nos. 2,491,832 and 3,094,515 mentioned hereinbefore.

From Table I it can be seen that dye dispersants 1 to 4 have high molecular weights; however, they have fewer acid groups (as indicated by the increased equivalent weights and the decreased percentages of sulfur) than dispersants 5 to 10 prepared according to the process of the present invention.

From Table II, a comparison of the tests using dispersants prepared by Examples I and II shows that simultaneous air-blowing with the caustic heat treatment produces the best quality dye dispersants. When employing the usual amount of dye dispersant in the dye cake, that is one part dispersant to one part dye as in Tests 1 to 8, there appears to be little difference in the products of Examples I and II. The marked superiority of the product of Example I over that of Example II becomes evident however when a reduced amount of dispersant is used in the dye cake as shown in Tests 9 to 16.

While Table I presents characteristic analytical differences of the high molecular weight lignosulphonate fractions prepared by the prior art sulphuric acid precipitation procedure and by the process of the present invention, the effect of such differences upon dye dispersant properties is shown in Table III. The data presented in Tables III and IV show that the process of the present invention yields superior quality dye dispersants.

TABLE II

Comparison of the dye dispersing properties of caustic heat treated spent sulphite liquor materials and of fractions prepared thereof by means of diffusional separation procedure

| Test No. | Description of the sample material | | | Weight | | Ratio of dispersant to dyestuff | Dispersion test [1] | | Heat stability test [1] | |
|---|---|---|---|---|---|---|---|---|---|---|
| | Example No. | Fraction | Weight percent included | Molecular | Equivalent | | Filtration time, sec. | Residue, mg. | Filtration time, sec. | Residue, mg. |
| 1 | I | Unfractionated | 100 | [2] 5,000 | 170 | 1:1 | 1.0 | 57.8 | 1.0 | 61.9 |
| 2 | I | High mol. wt | 27.1 | 7,900 | 191 | 1:1 | 1.0 | 56.2 | 1.0 | 57.0 |
| 3 | I | Med. mol. wt | 36.5 | 4,700 | 155 | 1:1 | 1.0 | 62.3 | 1.5 | 70.4 |
| 4 | I | Low mol. wt | 36.4 | 1,000 | 102 | 1:1 | 5.0 | 499.5 | 3.5 | 464.8 |
| 5 | II | Unfractionated | 100 | [2] 5,000 | 230 | 1:1 | 1.0 | 83.7 | 7.0 | 460.2 |
| 6 | II | High mol. wt | 33.0 | 9,000 | 313 | 1:1 | 1.0 | 60.0 | 1.0 | 82.5 |
| 7 | II | Med. mol. wt | 26.0 | 6,400 | 254 | 1:1 | 1.0 | 57.1 | 1.0 | 77.1 |
| 8 | II | Low mol. wt | 41.0 | 1,300 | 145 | 1:1 | 4.5 | 515.2 | 2.0 | 486.5 |
| 9 | I | Unfractionated | 100 | [2] 5,000 | 170 | 0.6:1 | 3.0 | 117.5 | 13.0 | 214.3 |
| 10 | I | High mol. wt | 27.1 | 7,900 | 191 | 0.6:1 | 1.0 | 61.1 | 1.5 | 59.5 |
| 11 | I | Med. mol. wt | 36.5 | 4,700 | 155 | 0.6:1 | 1.0 | 57.8 | 1.5 | 65.5 |
| 12 | I | Low mol. wt | 36.4 | 1,000 | 102 | 0.6:1 | 10.0 | 629.9 | 5.0 | 597.6 |
| 13 | II | Unfractionated | 100 | 4,300 | 253 | 0.6:1 | 13.0 | 610.9 | 6.0 | 572.6 |
| 14 | II | High mol. wt | 27.0 | 5,400 | 336 | 0.6:1 | 50.0 | 591.3 | 10.0 | 583.7 |
| 15 | II | Med. mol. wt | 34.6 | 4,000 | 245 | 0.6:1 | 50.0 | 624.2 | 12.0 | 611.4 |
| 16 | II | Low mol. wt | 38.4 | 1,400 | 162 | 0.6:1 | 5.0 | 640.7 | 2.5 | 595.6 |

[1] Ratio of dispersant to dye 0.6:1.
[2] Approximate.

TABLE III

Dyestuff dispersant evaluation of air-blown caustic heat treated spent sulphite liquor derived high molecular weight fractions prepared by different methods of fractionation

| Serial No. | Caustic heat treatment | Method of fractionation | Weight percent solids included in high mol. wt. fraction | Weight Equivalent | Weight Molecular | Dispersion test [1] Filtration time, sec. | Dispersion test [1] Residue, mg. | Heat stability test [1] Filtration time, sec. | Heat stability test [1] Residue, mg. |
|---|---|---|---|---|---|---|---|---|---|
| 1 | Example IV | $H_2SO_4$ precipitation | [2] 35 | 348 | 13,800 | 210.0 | 641.3 | 180.0 | 629.0 |
| 2 | Example III | do | [2] 35 | 547 | 34,600 | 23.0 | 369.5 | 4,080 | 632.7 |
| 3 | do | Diff. separation | 40 | 264 | 4,900 | 14.0 | 280.7 | 10.0 | 576.0 |
| 4 | do | $H_2SO_4$ precipitation | [2] 35 | 424 | 5,500 | 480 | 602.0 | 1,650 | 503.0 |
| 5 | do | Diff. separation | 58.1 | 227 | 4,200 | 1.5 | 60.0 | 4.0 | 112.8 |
| 6 | Example I | do | 28.0 | 264 | 9,300 | 1.0 | 57.3 | 1.0 | 50.9 |
| 7 | do | do | 41.9 | 265 | 8,000 | 1.5 | 55.0 | 1.5 | 63.7 |
| 8 | do | do | 59.5 | 205 | 6,400 | 1.0 | 59.5 | 1.5 | 62.5 |
| 9 | do | Acetone extraction | 63.0 | 191 | 9,250 | 1.0 | 66.2 | 1.0 | 67.4 |
| 10 | do | Isopropanol extraction | 58.4 | 237 | 11,200 | 1.0 | 60.8 | 1.5 | 60.6 |
| 11 | do | Dialysis | 42.0 | 267 | 16,800 | 1.5 | 61.8 | 2.0 | 60.6 |
| 12 | do | Unfractionated | | 169 | 6,100 | 3.0 | 117.0 | 13.0 | 214.3 |

[1] Ratio of dispersant to dye 0.6:1.
[2] Approximate.

TABLE IV

Comparison of dye dispersant properties of Examples I–XV listed in Table V and described in the following

| Example No. | Sequence of operational steps: Caustic heat treatment | Sequence of operational steps: Fractionation | Weight percent total solids in the sample | Fractionation method | Dispersion test [1] Filtration on time, sec. | Dispersion test [1] Residue, mg. | Heat stability test [1] Filtration time, sec. | Heat stability test [1] Residue, mg. |
|---|---|---|---|---|---|---|---|---|
| I | First | Second | 59.5 | Diff. separation | 1.0 | 59.5 | 1.5 | 62.5 |
| II | First (not air blown) | do | 27.0 | do | 50.0 | 591.3 | 10.0 | 583.7 |
| III | First | do | [2] 35 | $H_2SO_4$ precipitation | 480.0 | 602.0 | 1,650.0 | 503.0 |
| IV | do | do | [2] 35 | do | 210.0 | 641.3 | 180.0 | 629.0 |
| V | Second | First | 28 | Lime precipitation | 1.0 | 72.0 | 1.0 | 75.0 |
| VI | do | do | 40 | Diff. separation | 1.5 | 58.6 | 1.5 | 62.0 |
| VII | do | do | 40 | Dialysis | 1.0 | 71.0 | 1.0 | 62.3 |
| VIII | do | do | 71.8 | do | 1.0 | 82.1 | 2.0 | 79.8 |
| IX | First | Second | 42 | do | 1.5 | 61.8 | 2.0 | 60.6 |
| X | Second | First | 52 | Reverse osmosis | 1.0 | 73.3 | 1.0 | 74.6 |
| XI | do | do | 70 | Electrodialysis | 1.5 | 80.8 | 1.5 | 77.2 |
| XII | do | do | 64 | Solvent extraction | 1.5 | 93.9 | 1.5 | 91.9 |
| XIII | do | do | 33 | do | 1.0 | 72.2 | 1.0 | 57.1 |
| XIV | First | Second | 58.4 | do | 1.0 | 60.8 | 1.5 | 60.6 |
| XV | do | do | 63.0 | do | 1.0 | 66.2 | 1.0 | 67.4 |

[1] Ratio of dispersant to dye 0.6:1.
[2] Approximate.

A brief description of the methods available for the fractionation of both the untreated spent sulphite liquors and of the caustic heat treated products thereof follows and a summary of these methods is presented in Table V. While diffusional separation and membrane separation (such as dialysis through membranes of appropriate porosities) procedures are the preferred methods of carrying out the fractionation step, any of the other fractionation methods, listed in Table V as being applicable, may be used.

Contrary to fractionation by ion exclusion [reported by W. C. Baumann et al. in Ind. Eng. Chem., 45, 228–233 (1953)], which separates nonionic from ionic materials, the method of the present invention separates ionic or nonionic materials having different molecular sizes. The smaller molecules diffuse into the aqueous portion of the resin beads and the larger molecules either remain in the surrounding aqueous phase or diffuse into the resin beads more slowly and thereby to a lesser extent. Unlike the ion exclusion process, diffusional separation is more effective under non-equilibrium conditions, that is, for example when brief contact periods are used, and does not require multi-plate distribution.

The operation of an ion exchange column for the fractionation of spent sulphite liquor solids is carried out as follows: A column (about 150 cm. high and 15 cm. diameter) is filled in the usual manner with the sodium salt of an appropriate ion exchange resin, such as that available under the trademark "Dowex 50–X2." About 4 liters of a concentrated solution of a sodium base spent sulphite liquor containing up to 2000 g. of solids is allowed to flow downward through the resin bed until all has penetrated the resin, then about 15 l. of water is used as an eluant to remove all solids, in the desired fractions, from

TABLE V

Fractionation methods for the preparation of improved dyestuff dispersants

| Serial No. | Fractionation method | Applicability of the method for the fractionation of untreated spent sulphite liquor | Applicability of the method for the fractionation of air-blown caustic heat treated spent sulphite liquor |
|---|---|---|---|
| | (A) Fractional precipitations: | | |
| 1 | Sulphuric acid precipitation | Not applicable | Applicability to specifically treated materials only, Examples III and IV |
| 2 | Lime precipitation | Applicable, Example V | Not applicable. |
| 3 | Diffusional separation | Applicable, Example VI | Applicable, Examples I and II. |
| | (C) Membrane separation processes: | | |
| 4 | Conventional dialysis | Applicable, Examples VII and VIII | Applicable, Example IX. |
| 5 | Reverse osmosis (ultrafiltration) | Applicable, Example X | Not applicable. |
| 6 | Electrodialysis | Applicable, Example XI | Do. |
| | (D) Organic solvent extractions: | | |
| 7 | Isopropanol extraction | Applicable, Example XII | Applicable, Example XIII. |
| 8 | Acetone extraction | Applicable, Example XIV | Applicable, Example XV. | the resin bed. The operation is complete in about 40 minutes and the average concentration of solids in the eluate is about 10% or about one-fifth of the original.

Dialysis is described in the Chemical Engineer's Handbook, 3rd ed., pp. 753-756 (1950). Conventional dialysis of a sodium base lignosulphonate solution, and of the caustic heat treated product thereof, through a "Cellophane" (trademark) membrane against water was carried out in a Graver Hi-Sep Dialyser. Following many hours of dialysis, from 40 to 70% of the original solids was contained in the retentate and the total solution (dialysate and retentate) was extensively diluted by as much as 25- to 50-fold. This extensive dilution is the main drawback of this process and is often not acceptable from an economic point of view.

Electrodialysis was carried out in an ionic stack pack unit described in Bulletin L-2 of Ionics Inc., Cambridge, Mass.

Reverse osmosis ultrafiltration) is based upon the combination of the principles involved in dialysis and ordinary filtration. Special membranes which allow flow only in one direction are used in specially designed cells under a positive pressure of at least 100 p.s.i. The fractionation takes place without dilution, so the fractionated solids are contained in the original solvent, the high molecular weight fraction having a higher solids concentration than the unfractionated solution. The combined use of pressure and specially designed membranes in this process renders it faster than conventional dialysis. The increased speed of fractionation and the avoidance of dilution are the outstanding features of this process.

For the fractionation of a sodium base lignosulphonate solution by reverse osmosis an Amicon Model 400 Cell was used with a very large pore size XM-4 membrane. Through a 30 cm.$^2$ membrane area 3400 ml. spent sulphite liquor of approximately 11% solids concentration was fractionated batchwise in thirty-six hours. The dialysate contained about 182 g. solids in a 7.3% solution, whereas the retentate contained about 197 g. (or about 52% of the original solids) in a 22.8% solution.

Reverse osmosis is not a satisfactory method for fractionating the caustic heat treated spent sulphite liquor since the membrane life is too short at high alkaline pH values and with such a liquor at reduced pH values, the membrane tends to become clogged by a gradual build-up of a slime-like precipitate.

Organic solvent extraction is one of the oldest methods of fractionation known in chemistry. Fractionation of spent sulphite liquor solids with isopropanol to produce tanning agents is described by H. B. Marshall et al. in U.S. Pat. No. 2,952,507 (issued Sept. 13, 1960) and with a variety of solvents including acetone to produce sugar derivatives is described by L. A. Boggs et al. in Canadian Pat. No. 581,310 (issued Aug. 11, 1959). High molecular weight fractions of spent sulphite liquor solids as well as of the caustic heat treated product thereof have been obtained, with yields of from about 30% to about 65% of the total solids, from the aqueous phase of isopropanol and acetone extraction procedures.

Table VI gives a comparison of the dye dispersing properties of spent sulphite liquor solids subjected to caustic heat treatment alone or to such treatment under blowing with air, nitrogen, and carbon dioxide and in the presence of nascent hydrogen. From Table VI it is seen that the dispersing properties of the product improve regardless of the kind of gas passing through the hot caustic reaction mixture and the degree of improvement varies only slightly with the use of air, nitrogen, carbon dioxide or nascent hydrogen. The heat stability properties of the product, on the other hand, are much more affected by the nature of the gas passing through the hot caustic reaction mixture and the use of air results in a product having the best heat stability properties.

TABLE VI

| Serial No. | Description of sample | Gas treatment | Weight percent SSL solids in material tested | Dispersion test* | | Heat stability test* | |
|---|---|---|---|---|---|---|---|
| | | | | Filtration time, sec. | Residue, mg. | Filtration time, sec. | Residue, mg. |
| 1 | Example VI | Air blowing | 40 | 1.0 | 71.7 | 1.0 | 72.7 |
| 2 | Example XVI | None | 40 | 7.5 | 263.2 | 120.0 | 564.0 |
| 3 | Example XVII | Carbon dioxide blowing | 28 | 1.0 | 89.1 | 23.0 | 517.8 |
| 4 | Example XVIII | Nitrogen blowing | 28 | 1.5 | 73.0 | 407.0 | 520.9 |
| 5 | Example XIX | Nascent hydrogen | 35 | 1.0 | 84.9 | 450.0 | 585.8 |

*Ratio of dispersant to dye 0.6:1.

TABLE VII

| Percentage caustic used on SSL solids | Length of heat-treatment, hrs. | Dispersion test* | | Heat stability test* | |
|---|---|---|---|---|---|
| | | Residue, mg. | Filtration time, secs. | Residue, mg. | Filtration time, secs. |
| 5.0 | 1.5 | 587.7 | 52.0 | 560.1 | 30.5 |
| 5.0 | 2.5 | 555.8 | 47.0 | 591.7 | 30.0 |
| 5.0 | 4 | 284.8 | 17.0 | 579.3 | 25.0 |
| 10.0 | 1.5 | 72.5 | 1.0 | 159.9 | 12.0 |
| 10.0 | 2.5 | 61.6 | 1.0 | 80.2 | 2.0 |
| 10.0 | 4 | 64.8 | 1.5 | 71.5 | 1.5 |
| 15.0 | 1.5 | 73.4 | 1.0 | 462.6 | 197.0 |
| 15.0 | 2.5 | 63.9 | 1.5 | 78.0 | 1.5 |
| 15.0 | 4 | 61.0 | 1.5 | 69.2 | 1.0 |
| 20.0 | 1.5 | 77.2 | 1.0 | 343.9 | 152.0 |
| 20.0 | 2.5 | 73.9 | 1.5 | 424.1 | 121.5 |
| 20.0 | 4 | 82.5 | 1.5 | 334.0 | 97.0 |

*Ratio of dispersant to dye 0.6:1.

Table VII is a summary of these caustic heat treatment experiments and of the dye dispersion tests. It indicates that the best dye dispersants are obtained, according to the present invention, when the air-blown caustic heat treatment is carried out at 155° C. using 10 to 15 percent by weight sodium hydroxide for a period of from 2 to 4 hours.

The embodiments of the invention in which an exclusive property or privilege is claimed are defined as follows:

1. A lignin sulphonate dispersing agent obtained from spent sulphite liquor solids by heating a liquor selected from the group consisting of sodium and ammonium base spent sulphite liquors and containing said solids at a temperature from about 130° C. to about 175° C. with from about 3% to about 20% by weight, on the solids weight basis, of a base selected from the group consisting of alkali metal and ammonium hydroxides for from 45 minutes to about 4 hours to increase the number of functional acid groups on the lignosulphonate molecules; and fractionating said solids by a physical method to recover a fraction containing lignosulphonates having molecular weights greater than 4000.

2. A process for producing a lignin sulphonate dispersing agent from spent sulphite liquor solids comprising: heating a liquor, selected from the group consisting of sodium and ammonium base spent sulphite liquors and containing said solids, at a temperature of from about 130° C. to about 175° C. with from about 3% to about 20% by weight, on the solids weight basis, of the corresponding hydroxide for a period of from 45 minutes to about 4 hours to increase the number of functional acid groups on the lignosulphonate molecule; and fractionating said solids by a physical method to provide a fraction containing lignosulphonates which have molecular weights greater than about 4000, and recovering said fraction.

3. The process defined in claim 2, wherein the heat treatment step precedes the fractionation step.

4. The process as defined in claim 2, wherein the fractionation step precedes the heat treatment step.

5. The process defined in claim 2, wherein the heat treatment step is carried out under continuous air-blowing.

6. The process defined in claim 2, wherein the fractionation method is one of diffusional separation, dialysis, reverse osmosis and solvent extraction.

7. A process for producing a lignin sulphonate dispersing agent from sodium base spent sulphite liquor solids which comprises: heating a liquor containing said solids at a temperature of from about 130° C. to about 175° C. with from 5% to 20% of sodium hydroxide by weight calculated on the weight of said solids, for a period of from 45 minutes to 4 hours under continuous air-blowing to increase the number of functional acid groups on the lignosulphonate molecule; and fractionating said solids by one of diffusional separation, dialysis, reverse osmosis and solvent extraction to provide a fraction containing lignosulphonates having molecular weights greater than about 4000.

8. A process for producing a lignin sulphonate dispersing agent from sodium base spent sulphite liquor solids which comprises: fractionating the liquor containing said solids to obtain a fraction containing lignosulphonates having molecular weights greater than about 4000 by following one of diffusional separation, dialysis, reverse osmosis and solvent extraction; and heating said fraction at a temperature of from about 130° C. to about 175° C. for from 2 to 4 hours with from 5% to 20% of sodium hydroxide by weight calculated on the weight of said solids to increase the number of functional acid groups on the lignosulphonate molecule.

9. A process for producing a lithium lignosulphonate dispersing agent from sodium base spent sulphite liquor solids which comprises: fractionating a liquor containing said solids to obtain a fraction containing lignosulphonates having molecular weights greater than about 4000 by following one of diffusional separation, dialysis, reverse osmosis and solvent extraction; replacing sodium in said fraction by lithium through a cation-exchange mechanism; and heating the lithium lignosulphonate-containing fraction thus obtained at a temperature of from about 130° C. to about 175° C. for from 2 to 4 hours with from 5% to 15% by weight of lithium hydroxide on a solids weight basis to increase the number of functional acid groups on the lignosulphonate molecule.

10. A process for producing a potassium lignosulphonate dispersing agent from sodium base spent sulphite liquor solids which comprises: fractionating a liquor containing said solids to obtain a fraction containing lignosulphonates having molecular weights greater than about 4000 by following one of diffusional separation, dialysis, reverse osmosis and solvent extraction, replacing sodium in said fraction by potassium through a cation-exchange mechanism; and heating the potassium lignosulphonate-containing fraction thus obtained at a temperature of from about 130° C. to about 175° C. for from 2 to 4 hours with from 5% to 15% by weight of potassium hydroxide on a solids weight basis to increase the number of functional acid groups on the lignosulphonate molecule.

11. A process for preparing an ammonuim lignosulphonate dispersing agent from ammonium base spent sulphite liquor solids which comprises: fractionating the liquor containing said solids to obtain a fraction containing lignosulphonates having molecular weights greater than 4000 by following one of diffusional separation, dialysis, reverse osmosis and solvent extraction; and heating said fraction at a temperature of from about 130° C. to about 175° C. for from 2 to 4 hours with from 5% to 20% of ammonium hydroxide by weight on a solids weight basis to increase the number of functional acid groups on the lignosulphonate molecule.

12. A process for preparing a sodium lignosulphonate dispersing agent from sodium base spent sulphite liquor solids which comprises: fractionating a liquor containing said solids to obtain a fraction containing lignosulphonates having molecular weights greater than 4000 by following one of diffusional separation, dialysis, reverse osmosis, and solvent extraction; adding to said fraction from 1% to 10% by weight on a solids basis of an ion selected from ferric and chromate ions; and thereafter heating said fraction at a temperature of from about 130° C. to about 175° C. for from 2 to 4 hours with from 5% to 20% of sodium hydroxide by weight on a solids basis to increase the number of functional acid groups on the lignosulphonate molecule; and recovering the sodium lignosulphonate dispersing agent complexed with one of iron and chromium.

13. A process for producing a sodium lignosulphonate dispersing agent from sodium base spent sulphite liquor solids which comprises: heating the liquor containing said solids at a temperature from about 130° C. to about 175° C. with from 3% to 5% of sodium hydroxide by weight, calculated on the weight of said solids, for from 45 minutes to 2 hours to increase the number of functional acid groups on the lignosulphonate molecular; and fractionating said solids by means of diffusional separation to obtain a fraction containing about 40% of the total solids and consisting of lignosulphonates having molecular weights greater than about 4000.

14. A process for producing an ammonium lignosulphonate dispersing agent from ammonium base spent sulphite liquor solids which comprises: heating the liquor containing said solids at a temperature of from about 130° C. to about 175° C. with from 3% to 5% of ammonium hydroxide by weight, calculated on the weight of said solids, for from 45 minutes to 2 hours to increase the number of functional acid groups on the lignosulphonate molecule; and fractionating said solids by means of diffusional separation to obtain a fraction containing about 40% of the total solids and consisting of lignosulphonates having molecular weights greater than about 4000.

References Cited

UNITED STATES PATENTS 2,783,122   2/1957   Hoekge _____ 260—124X
2,802,815   8/1957   Doughty _____ 260—124
3,251,820   5/1966   Grangaard _____ 260—124

OTHER REFERENCES

Jensen et al.: "Tappi," vol. 45 (1962), pp. 122–127.

CHARLES B. PARKER, Primary Examiner

D. R. PHILLIPS, Assistant Examiner

U.S. Cl. X.R.

8—89; 106—308